Nov. 15, 1966   C. E. CLOUD   3,284,984
MAKING INDIVIDUAL CONDIMENT PACKAGES
Original Filed Jan. 19, 1960   2 Sheets-Sheet 1
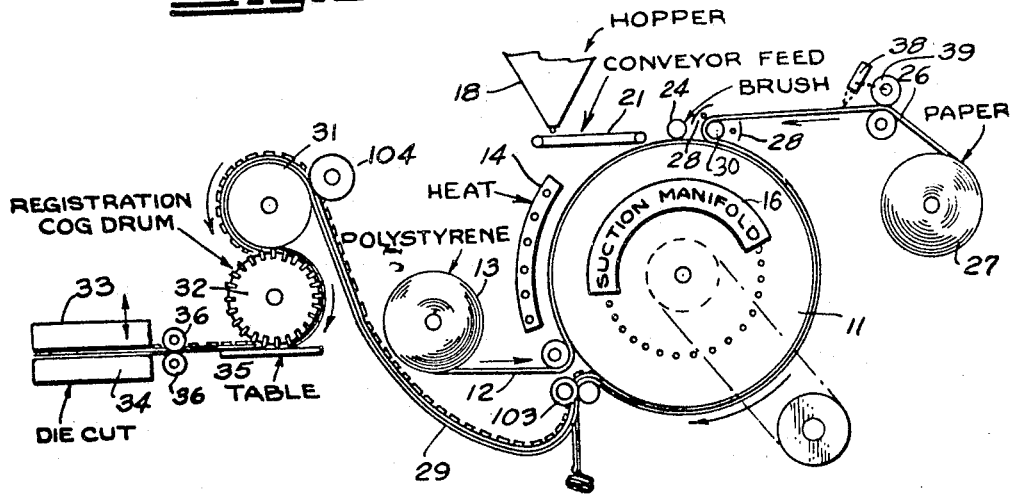
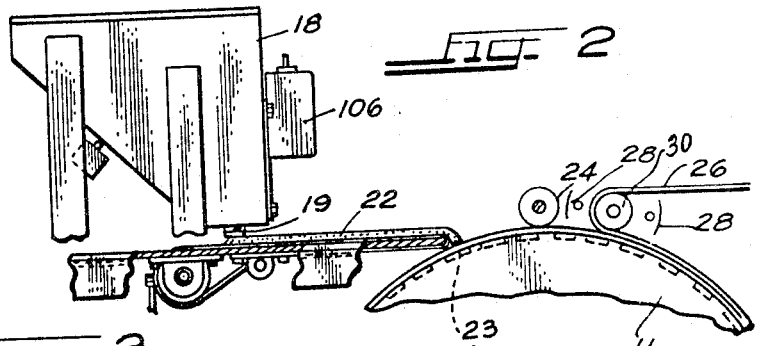
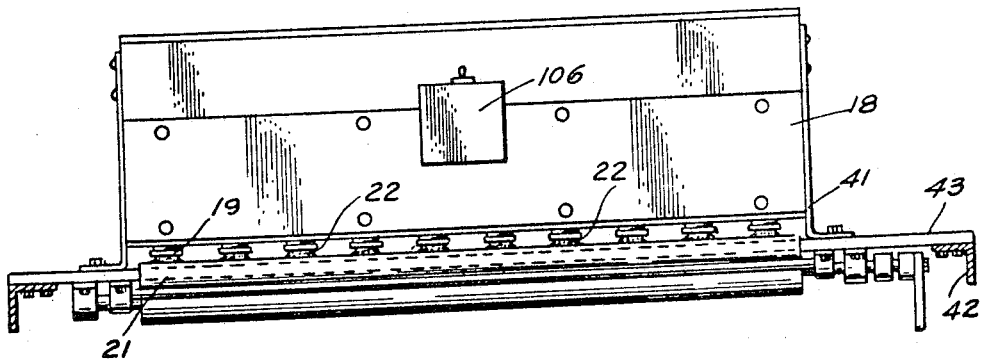
INVENTOR.
CHARLES E. CLOUD
BY Darbo, Robertson, & Vandenburgh
ATTYS.

Nov. 15, 1966   C. E. CLOUD   3,284,984
MAKING INDIVIDUAL CONDIMENT PACKAGES
Original Filed Jan. 19, 1960   2 Sheets-Sheet 2
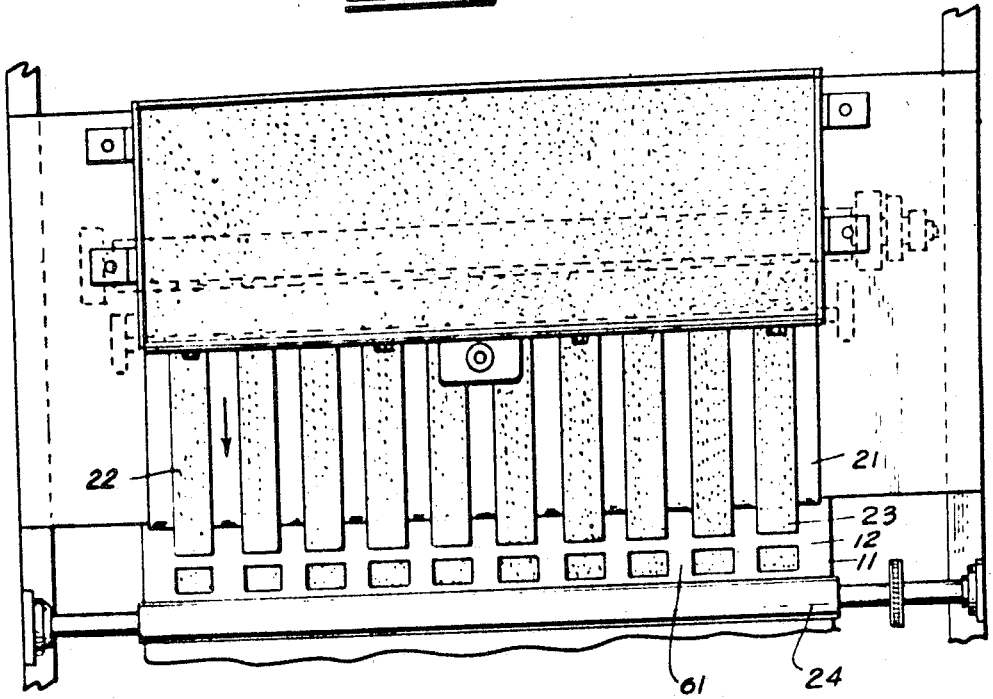
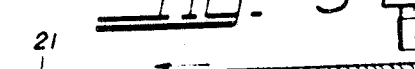
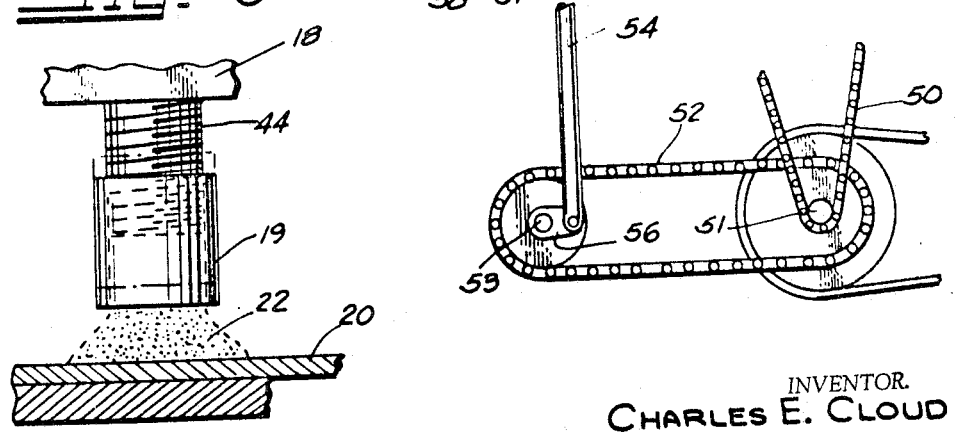
INVENTOR.
CHARLES E. CLOUD
BY Darbo, Robertson & Vandenburgh
ATTYS.

United States Patent Office 3,284,984
Patented Nov. 15, 1966

3,284,984
MAKING INDIVIDUAL CONDIMENT PACKAGES
Charles E. Cloud, 150 Prairie Ave., Wilmette, Ill.
Original application Jan. 19, 1960, Ser. No. 3,463. Divided and this application Mar. 6, 1963, Ser. No. 268,509
9 Claims. (Cl. 53—180)

This application is a division of application, Serial Number 3,463 filed January 19, 1960, now abandoned.

There is a large and growing demand for individual condiment packages of the type in which the top can be broken open and the package used as a shaker to shake the salt or pepper on the food. Heretofore large quantities of these individual shaker packages have been made of paper, at least one side being corregated to hold the condiment in the separate tubes formed by the corregations. It has been evident for a long time that in spite of the present low cost of the paper packages, substantial money could be saved with a simpler package, preferably formed at least in part of a stretchable plastic film. According to the present invention, a method and suitable apparatus are provided for the economical and reliable production of these individual packages.

The style of package to be produced according to the present invention is one illustrated in the October 1958 Modern Packaging. A flat paper backing is sealed along or near its edges to a "blister" or stretch-formed face, the salt or pepper being in the chamber formed between the two layers. The plastic layer or blister has a tiny pour spout formed on it to be broken open for pouring or shaking. A score mark across the spout and the adjacent corner of the sealed portions facilitates the breaking of the spout.

As disclosed in the Modern Packaging article, this package is formed by passing the plastic film along a drum having many (for example, 1000) shallow cavities in it, heating the film to make it plastic, drawing it into the cavities by suction, placing an accurately measured "fill" of salt in each recess thus formed in the plastic, and sealing a continuous web of lacquer-coated paper to the plastic between and surrounding the recesses.

Although the article mentioned optimistically gave the impression of adequate production, the work was still experimental and problems remained to be solved. In the course of this invention, these problems have been overcome. They are related to economy in manufacture. In producing these packages by the millions, it is highly desirable to use wide webs of the plastic film and paper so that thus there will be a multiplicity of recesses in the plastic as by using a drum having a succession of perhaps 100 closely spaced rows of cavities each row having, say 10, cavities therein, the spacing of the cavities being appropriate for cutting apart without wastage.

One of the problems was to provide an accurately measured fill in these numerous cavities and at the same time present to the approaching paper clean sealing surfaces surrounding the filled recesses. This application relates especially to a solution of this problem. This problem has been solved by the combination of a multispouted hopper and a conveyor belt so arranged as to apply to the belt moving under its spouts a number of parallel windrows of the salt or pepper. Each of these windrows moves in alignment with one line of recesses. The conveyor is actuated by steps in timed relation to the drum and dumps a given length of windrow into each recess. This alone accomplishes a fairly clean filling operation, but a few grains of salt or pepper find their way onto the sealing surfaces. It has been found, however, that these can be cleaned off quite satisfactorily with a proper rotary wiper.

The cutting apart of the individual packages also presented some problems. The parent application included disclosure relative to this problem which is mostly omitted from this application, but which is still the subject of a pending application.

Additional objects and advantages of the invention will be apparent from the following description and from the drawings.

Designation of figures

FIG. 1 is a diagrammatic view of the apparatus chosen for illustration of the invention.

FIG. 2 is a fragmentary side view, partly broken away to a sectional view, of the parts of the apparatus indicated in FIG. 1 at the filling position.

FIG. 3 is a view of the filling unit shown in FIG. 1, as seen from the side shown at the right in FIG. 1.

FIG. 4 is a plan view of the portions of the apparatus shown in FIG. 2.

FIG. 5 is a fragmentary view on an enlarged scale showing especially the intermittent drive for the belt shown in FIG. 2.

FIG. 6 is a fragmentary view on a still larger scale showing especially the adjustable spout for controlling the amount of salt laid on the conveyor per inch of its movement.

General description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

As seen best in FIG. 1, a drum 11 is driven in a clockwise direction and draws a web 12 of polystyrene film from a roll 13. This is a thick film, perhaps better called a sheet. This sheet passes under a heater 14, preferably of the radiant type, which softens the sheet. The sheet is then drawn by suction applied through a vacuum header 16 bearing the legend "Suction Manifold" into cavities too shallow to be represented in FIG. 1, thus forming the recesses, commonly called blisters, to be filled.

A supply of the material with which the packages are to be filled is maintained in a hopper 18. This hopper is provided with a line of spouts 19 under which a conveyor belt 21 runs, so that the belt 21 receives a line or windrow 22 of the film material as best seen in FIG. 2. Preferably the belt 21 does not move constantly, but is moved intermittently, moving only when a cavity 23 is positioned to receive the fill material which will be dumped over the end of the conveyor by the movement of the conveyor.

Any fill material which does not stay in the cavities is brushed away by a rotating brush 24 so as to clean the surfaces between the cavities to receive in sealing engagement therewith a web of paper 26 drawn from a roll 27. This paper is lacquer-coated or otherwise suitable on the surface applied to the web 12 to seal to it, at least under the influence of heat. Heat sealing is accomplished by heaters 28, preferably radiant. In the illustrated form these preheat the guide roll 30 and heat the paper 26 just as it is about to engage the sheet 12.

From the drum 11 (after edge trimming described below) the combined web 29 runs around a guide roll 31 and then around a registration roll 32. This registration roll 32 may appropriately be called a cog drum. It is provided with transversely extending cogs or raised bars which fit fairly close within the spaces between the packages so as to induce accurate registration between the packages and the cog drum. This cog drum 32 is driven and stopped intermittently, the successive movements each being the overall length of the finished packages. Each time the stopping of the cog drum 32 stops the movement of the web, a movable die block 33 moves into cooperation with stationary die block 34 to cut the finished packages from the web. Feed rollers 36 may grip the web lightly enough to slip on the web when the web is held from forward movement. The feed rollers 36 also engage the spaces lengthwise of the web between the lines of blisters. Edge guides 35 ensure accurate lateral registration of the web as it enters the dies.

Although there is sufficient slack in the web 29 between drum 11 and feed roll 31 to permit the intermittent movement at drums 31 and 32 without straining on the web when drum 11 rotates continuously, the two may nevertheless move at equal speeds in packages per minute so that the amount of slack remains substantially constant. In practice, it has been found practicable to let slack pile up under edge trimmer rolls 103, so that drum 11 need not be driven in direct correlation to cog drum 32.

Registration of printing on paper web 26 with the blisters is preferably provided by an electric eye 38 and eye-controlled brake 39 which stretches the web 26 minutely as required. The eye 38 operates in timed relation to the passage of cavities in drum 11.

Measure-filling apparatus

A form of measuring and filling apparatus which has been found to be exceptionally satisfactory is as shown in FIGS. 2 to 6. The hopper 18 is carried by brackets 41 which in turn are supported by main frame 42 either directly, or, as illustrated, by table 43. The hopper 18 is provided with spouts 19 which, as seen best in FIG. 3, are arranged in a line extending transversely of feed belt 21. As the feed belt moves under nozzles 19, each nozzle deposits on the feed belt a windrow 22 so that, as seen best in FIG. 4, there is produced a plurality of parallel windrows. Each windrow is aligned with a line of blisters 23 in the sheet 12 carried by the drum 11.

The depth of the material in each windrow 22 is determined by adjustability of the spouts 19, as seen best in FIG. 6. For example, each spout 19 may be threaded to a coupler 44, which may be said to form the body of the spout, extending down from hopper 18. By screwing the spout 19 up or down on coupler 44, its height above belt 21 is adjusted. The height of windrow 22 necessarily determines the amount of fill material which is in each inch of length of windrow 22. Accordingly, if the feed belt 21 is moved a given distance each time one of the pockets 23 is located under its discharge end, it will dump the same amount of fill into each of the pockets 23 in succession. The dumping of the fill material from the belt 21 can be confined to periods when a row of pockets 23 is positioned to receive the fill, by actuating the belt 21 to move intermittently in timed relation with the drum 11. This may be accomplished, for example, as seen in FIG. 5. Drive shaft 51 is a driven shaft which drives drum 11, through means maintaining a constant relation to it, as through timing belt 50. Through a chain 52 it drives shaft 53 one revolution for each passage of a row of pockets 23 past a given point. Thus for each such movement there is a reciprocation up and down of connecting rod 54 which is driven by crank 56. Connecting rod 54 oscillates lever 57 which is connected to drive pulley 58 through a one-way drive device.

It is desirable to lay a relatively flat-topped fill in each pocket. This is approached merely by having the belt 21 feed during substantially the full time the continuously moving pocket is in receiving position. It is further achieved by having the depth of pockets gradually reduced toward the sides (see FIG. 13) and adjusting the spouts 19 (shown too high in FIG. 6) to provide a windrow of correspondingly varying depth, transversely.

Clean-off roll

Slightly beyond the filling point, brush or clean-off roll 24 is driven in a direction to sweep backwards along the film 12 any loose material on its sealing surfaces 61 surrounding each of the pockets 23. The brush 24 may not appear to be a brush in the ordinary sense. It is, however, a brush in the sense of brushing back the grains of fill which are not in the pockets. It also levels off the fill in the pockets to the depth in the pockets reached by brush 24. The surface of the brush 24 is preferably accurately cylindrical, as by being a closely clipped (such as 1/8") nap of mohair fibers closely packed as in rug making. The material is readily available on the markets, being a material of which high grade paint applying rollers are made. Although other materials could no doubt be used with a moderate degree of success, this brush has been found to be exceptionally effective. It is deemed important to have a closely packed surface of individually resilient brush elements such as bristles or fibrous strands. Close spacing of these elements at the surface of the roll requires that they be short as otherwise they would be too crowded where they are secured.

For pepper, or any other material not dependably free flowing, a vibrator 106 can be mounted on hopper 18.

The features here described have combined to provide a very satisfactory, dependable, and economically operated apparatus suitable for forming by the millions individual portion packages such as are now widely used for salt and for pepper. For economical production, a relatively high operating speed is desired. At the filling position, the filling device can reciprocate at a fairly good frequency and still measure with sufficient accuracy.

I claim:

1. Package-forming and filling apparatus including means for moving past a filling station a sheet having pockets formed therein, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout terminating slightly above the conveyor belt to apply a windrow of material from the hopper along the conveyor belt as the belt moves, said belt moving the window to the filling station and doubling back therefrom to dump the windrow, and means for moving the belt intermittently with momentary interruptions in the movement, successive movements being in timed relation with the movement of the successive pockets past the dumping position to advance the belt only when a pocket will be in a position to receive the material from the belt, and a clean off roll positioned between the filling station and the position where the two sheets are brought together and rotated in a direction to brush back toward the filling station any material on the surfaces of the pocketed sheet surrounding the pockets to present clean surfaces to the second sheet.

2. Package-forming and filling apparatus including means for moving past a filling station a sheet having pockets formed therein along a plurality of parallel lines with the pockets lying abreast to form rows, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout for each line terminating slightly above the conveyor belt to apply in the plane of each line a windrow of material from the hopper along the conveyor belt as the belt moves, said belt moving the windrows to the filling station and doubling back therefrom to dump the windrows, and means for moving the belt intermittently with momentary interruptions in the movment, successive movements being in timed relation with the movement of the rows of successive pockets past the dumping position to advance the belt only when a row of pockets will be in position to receive the material from the belt, and a clean off roll positioned between the filling station and the position where the two sheets are brought together and rotated in a direction to brush back toward the filling station any material on the surfaces of the pocketed sheet surrounding the pockets, to present clean surfaces to the second sheet.

3. Package-forming and filling apparatus including means for moving past a filling station a sheet having pockets formed therein along a plurality of parallel lines with the pockets lying abreast to form rows, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout for each line terminating slightly above the conveyor belt to apply in the plane of each line a windrow of material from the hopper along the conveyor belt as the belt moves, said belt moving the windrows to the filling station and doubling back therefrom to dump the windrows, and means for moving the belt intermittently with momentary interruptions in the movement, successive movements being in timed relation with the movement of the rows of successive pockets past the dumping position to advance the belt only when a row of pockets will be in a position to receive the material from the belt, and a clean off roll positioned between the filling station and the position where the two sheets are brought together and rotated in a direction to brush back toward the filling station any material on the surfaces of the pocketed sheet surrounding the pockets, the present clean surfaces to the second sheet, said clean off roll having a nap-type surface of closely packed radially extending resilient elements contoured to a uniform cylinder.

4. Filling apparatus including means for moving containers to be filled past a filling station, a conveyor belt, a hopper over the conveyor belt having a spout terminating slightly above the conveyor belt to apply a windrow of material from the hopper along the conveyor belt as the belt moves, said belt moving the windrow toward the filling station and doubling back therefrom to dump the windrow, and means for moving the belt intermittently with momentary interruptions in the movement, successive movements being in timed relation with the movement of the successive containers past the dumping position to advance the belt only when a container is in a position to receive the material from the belt.

5. Package-forming and filling apparatus including means for forming and continuously moving past a filling station a sheet having shallow pockets formed therein, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout terminating slightly above the conveyor belt to apply a windrow of material from the hopper along the conveyor belt as the belt moves, said belt moving the windrow to the filling station and doubling back therefrom to dump the windrow, and means for moving the belt intermittently with momentary interruptions in the movement, successive movements being in timed relation with the movement of the successive pockets past the dumping position to advance the belt only when a pocket will be in a position to receive the material from the belt but substantially for the duration of such positioning of the pocket, and a clean off roll positioned between the filling station and the position where the two sheets are brought together and rotated in a direction to brush back toward the filling station any material on the surfaces of the pocketed sheet surrounding the pockets to present clean surfaces to the second sheet.

6. Package-forming and filling apparatus including means for forming and continuously moving past a filling station a sheet having shallow pockets formed therein of reducing depth approaching the sides and of relatively uniform depth for most of their length in the direction of movement, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout terminating slightly above the conveyor belt to apply a windrow of material from the hopper along the conveyor belt as the belt moves of varying depth transversely of the windrow approximately matching the transversely varying depth of the pockets, said belt moving the windrow to the filling station and doubling back therefrom to dump the windrow, and means for moving the belt intermittently with momentary interruptions in the movement, successive movements being in timed relation with the movement of the successive pockets past the dumping position to advance the belt only when a pocket will be in a position to receive the material from the belt but substantially for the duration of such positioning of the pocket, and a clean off roll positioned between the filling station and the position where the two sheets are brought together and rotated in a direction to brush back toward the filling station any material on the surfaces of the pocketed sheet surrounding the pockets to present clean surfaces to the second sheet.

7. Package-forming and filling apparatus including means for moving past a filling station a sheet having pockets formed therein, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout terminating slightly above the conveyor belt to apply a windrow of material from the hopper along the conveyor belt as the belt moves, said belt moving the windrow to the filling station and doubling back therefrom to dump the windrow, and means for moving the belt intermittently with momentary interruptions in the movement, successive movements being in timed relation with the movement of the successive pockets past the dumping position to advance the belt only when a pocket will be in a position to receive the material from the belt, and a clean off means positioned between the filling station and the position where the two sheets are brought together engaging the surfaces of the pocketed sheet surrounding the pockets to brush therefrom any material thereon and present clean surfaces to the second sheet.

8. Package-forming and filling apparatus including means for moving past a filling station a sheet having pockets formed therein, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout terminating slightly above the conveyor belt to apply a windrow of material from the hopper along the conveyor belt as the belt moves, said belt moving the windrow to the filling station and doubling back therefrom to dump the windrow, and means for moving the belt intermittently with momentary interruptions in the movement, successive movements being in timed relation with the movement of the successive pockets past the dumping position to advance the belt only when a pocket will be in a position to receive the material from the belt, and means for ensuring the presentation to the second sheet of clean surfaces of the pocketed sheet surrounding the pockets.

9. Package-forming and filling apparatus including means for moving past a filling station a sheet having pockets formed therein, with the pockets opening upwardly as they pass the filling station, means for applying a second sheet over the pockets and sealing it to the portions of the first sheet surrounding the pockets, and means for filling the pockets prior to the application of the second sheet comprising a conveyor belt, a hopper over the conveyor belt having a spout terminating slightly above the conveyor belt to apply a windrow of material from the hopper along the conveyor belt as the belt moves, said belt moving the windrow to the filling station and doubling back therefrom to dump the windrow, and means for moving the belt intermittently with momentary interruptions in the movement, successive movements being in timed relation with the movement of the successive pockets past the dumping position to advance the belt only when a pocket will be in a position to receive the material from the belt.

References Cited by the Examiner

UNITED STATES PATENTS

| 1,577,218 | 3/1926 | Fletcher | 198—28 XR |
| 1,641,448 | 9/1927 | Merrick | 222—415 XR |
| 2,434,339 | 1/1948 | Stiles | 53—182 XR |
| 2,546,059 | 3/1951 | Cloud | 53—180 XR |
| 2,623,676 | 12/1952 | Baker et al. | 141—131 |
| 2,811,241 | 10/1957 | Bogaty | 198—35 XR |

FRANK E. BAILEY, *Primary Examiner.*

TRAVIS S. McGEHEE, *Examiner.*

S. ABEND, *Assistant Examiner.*